United States Patent
Rios Acebal et al.

(10) Patent No.: US 11,905,638 B2
(45) Date of Patent: Feb. 20, 2024

(54) LAUNDRY TREATING APPLIANCE FOR DRYING LAUNDRY

(71) Applicant: WHIRLPOOL CORPORATION, Benton Harbor, MI (US)

(72) Inventors: Marcos Javier Rios Acebal, Monterrey (MX); Eric G. Griswold, Saint Joseph, MI (US); Brooke M. Gundersen, Benton Harbor, MI (US); Nicholas Leep, Saint Joseph, MI (US); Adrian A. Rodriguez, Saint Joseph, MI (US); Brian K. Rogers, Watervliet, MI (US); James B. Sutton, South Bend, IN (US); Nicholas B. Vaive, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 483 days.

(21) Appl. No.: 17/081,386

(22) Filed: Oct. 27, 2020

(65) Prior Publication Data

US 2021/0156067 A1    May 27, 2021

Related U.S. Application Data

(60) Provisional application No. 62/939,168, filed on Nov. 22, 2019.

(51) Int. Cl.
*D06F 33/69* (2020.01)
*D06F 58/45* (2020.01)
(Continued)

(52) U.S. Cl.
CPC ............ *D06F 33/69* (2020.02); *B01D 46/46* (2013.01); *B01D 46/79* (2022.01); *D06F 25/00* (2013.01);
(Continued)

(58) Field of Classification Search
None
See application file for complete search history.

(56) References Cited

U.S. PATENT DOCUMENTS

| 2,833,056 A | 5/1958 | Smith |
| 3,139,633 A | 7/1964 | Fecho et al. |

(Continued)

FOREIGN PATENT DOCUMENTS

| CN | 101228306 A | 7/2008 |
| CN | 102154805 A | 8/2011 |

(Continued)

OTHER PUBLICATIONS

English Machine Translation for JP-2007037890-A.*

(Continued)

*Primary Examiner* — Mikhail Kornakov
*Assistant Examiner* — Pradhuman Parihar
(74) *Attorney, Agent, or Firm* — McGarry Bair PC

(57) ABSTRACT

A method of operating a laundry treating appliance with a combination washer/dryer having a cabinet defining an interior, a tub located within the interior, and a rotatable drum located within the tub interior and defining a treating chamber, and an air recirculation conduit, the method comprising supplying water to the treating chamber, rotating the drum, and draining the water from the laundry treating appliance.

5 Claims, 4 Drawing Sheets

(51) Int. Cl.
  D06F 33/54 (2020.01)
  D06F 33/57 (2020.01)
  D06F 34/28 (2020.01)
  B01D 46/46 (2006.01)
  D06F 25/00 (2006.01)
  B01D 46/79 (2022.01)
  *D06F 105/42* (2020.01)
  *D06F 105/34* (2020.01)
  *D06F 103/68* (2020.01)
  *D06F 101/20* (2020.01)
  *D06F 105/02* (2020.01)

(52) U.S. Cl.
  CPC .............. *D06F 33/54* (2020.02); *D06F 33/57* (2020.02); *D06F 34/28* (2020.02); *D06F 58/45* (2020.02); *B01D 2279/35* (2013.01); *D06F 2101/20* (2020.02); *D06F 2103/68* (2020.02); *D06F 2105/02* (2020.02); *D06F 2105/34* (2020.02); *D06F 2105/42* (2020.02)

(56) References Cited

U.S. PATENT DOCUMENTS

| | | | |
|---|---|---|---|
| 6,539,570 | B2 | 4/2003 | Youn et al. |
| 9,277,188 | B2 | 3/2016 | Ebrom et al. |
| 2015/0013075 | A1* | 1/2015 | Herrera ................. D06F 35/006 8/137 |
| 2015/0089979 | A1 | 4/2015 | Hengesbach et al. |
| 2016/0273150 | A1* | 9/2016 | Del Pos ................. D06F 39/02 |

FOREIGN PATENT DOCUMENTS

| | | | | |
|---|---|---|---|---|
| CN | 102428226 | B | 5/2014 | |
| CN | 108291357 | A | 7/2018 | |
| DE | 19742282 | C1 | 2/1999 | |
| EP | 2039819 | A1 | 3/2009 | |
| GB | 972411 | A | 10/1964 | |
| JP | 3863137 | B2 | 12/2006 | |
| JP | 3863167 | B1 | 12/2006 | |
| JP | 2007037890 | A * | 2/2007 | ............ D06F 25/00 |
| JP | 2014083138 | A | 5/2014 | |
| WO | WO-2011054761 | A1 * | 5/2011 | ............ D06F 25/00 |
| WO | 2013151345 | A2 | 10/2013 | |
| WO | 2015159173 | A1 | 10/2015 | |

OTHER PUBLICATIONS

English Machine Translation for WO-2011054761-A1.*
Chinese Office Action for Counterpart CN202011314459.0, dated Dec. 14, 2022, 16 Pages.
European Search Report for CounterpartEP20209346.4, 7 Pages, dated Mar. 24, 2021.

* cited by examiner

LAUNDRY TREATING APPLIANCE FOR DRYING LAUNDRY

CROSS-REFERENCE TO RELATED APPLICATIONS

This application claims priority to U.S. Provisional Patent Application No. 62/939,168, filed Nov. 22, 2019, which is incorporated herein by reference in its entirety.

BACKGROUND

Laundry treating appliances, such as washing machines, combination washer/dryers, refreshers, and non-aqueous systems, can have a configuration based on a rotating drum that at least partially defines a treating chamber in which laundry items are placed for treating. The laundry treating appliance can have a controller that implements a number of user-selectable, pre-programmed cycles of operation having one or more operating parameters. Hot water, cold water, or a mixture thereof, along with various treating chemistries, can be supplied to the treating chamber in accordance with the cycle of operation. In addition, hot air, cold air, or a mixture thereof can be supplied to the treating chamber in accordance with the cycle of operation and via an air flow assembly.

In laundry treating appliances with drying systems, typically an air flow circuit moves process air through the treating chamber to evaporate water from a load of laundry items via an inlet and an outlet in the treating chamber. A filter can be placed in an air flow circuit to aid in the capture, or reduction of lint from the air flow within the laundry treating appliance.

BRIEF SUMMARY

In one aspect, the present disclosure relates to a method of removing lint from a lint filter by rotating a drum within tub to move liquid in the tub onto the lint filter. The rotation speed profile can be controlled along with the amount of liquid to effect the removal of lint from the lint filter.

In another aspect, the present disclosure relates to a method of cleaning a lint filter in a combination washer/dryer having a tub, a controller, a drum rotatably mounted within the tub, an air conduit having a port fluidly connected to the tub, and a lint filter fluidly coupled to the portion and located in the tub. The method determines whether a previous cycle performed by the combination washer/dryer was a dry cycle, determines whether the single dose dispenser is selected for the current cycle, supplies a charge of water sufficient to at least partially immerse the drum while not immersing the lint filter and rotates the drum for a predetermined period of time if the controller determines the previous cycle was a dry cycle and the single dose dispenser is not selected.

DETAILED DESCRIPTION

Figure 1:
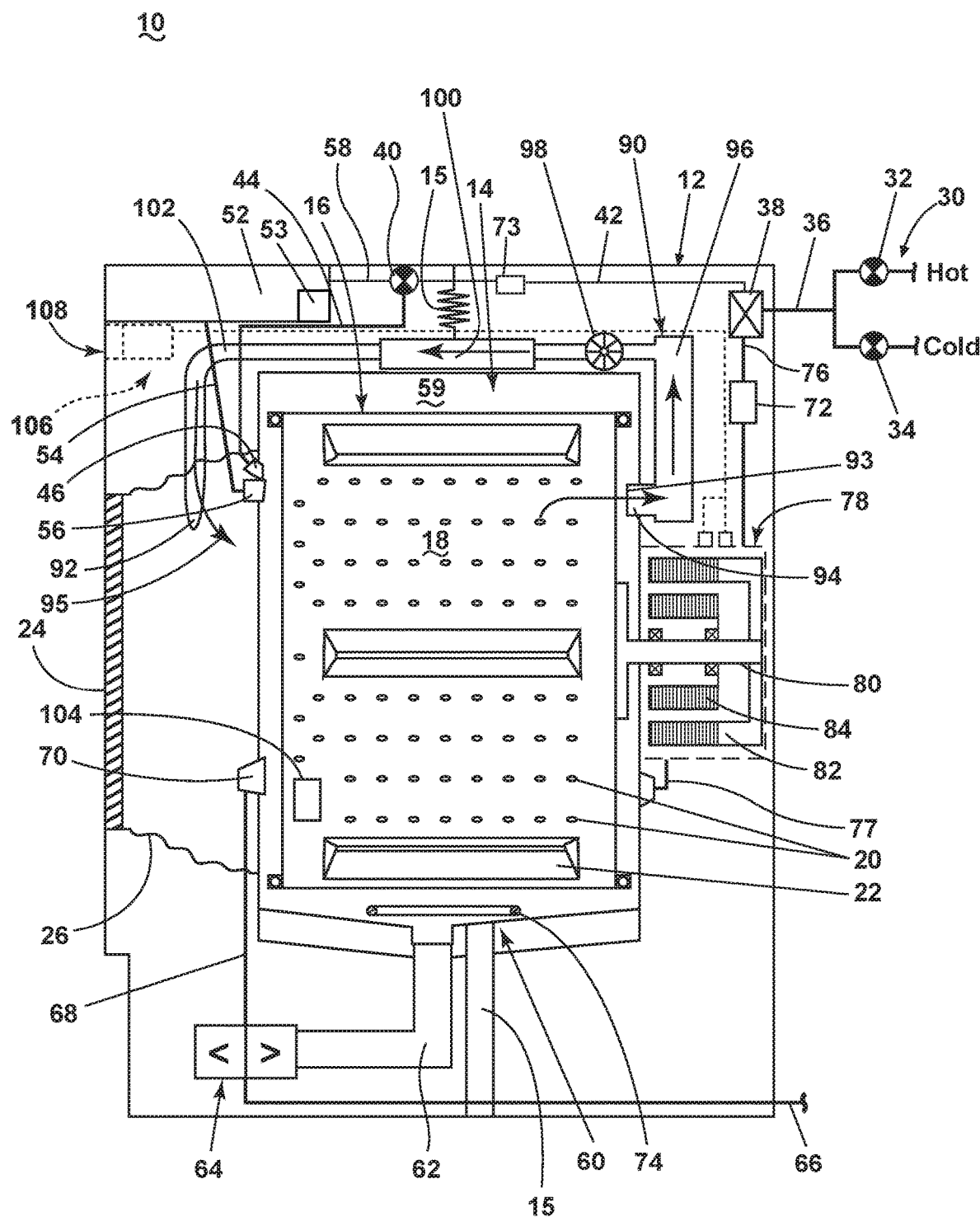
FIG. 1 illustrates a schematic cross-sectional view of a laundry treating appliance illustrated as a combination washer/dryer according to an aspect of the present disclosure.

Aspects of the disclosure relate to a method of removing lint or fluff from portions of an interior of a combination washing and drying machine after a dry cycle and before a washing cycle. Laundry treating appliances can be provided with structures and functionality both for washing and drying laundry items within a single appliance. In the case of such a combination washing and drying appliance, in addition to the components provided in a traditional washing machine, additional components for drying laundry items are also provided within the appliance. Non-limiting examples of such drying components include an air flow pathway, including an air inlet and an air outlet to the tub interior, a condenser, a blower, a heating element, and a filter.

In traditional combination washing and drying machines, lint or fluff from the laundry items can deposit on interior walls of a treating chamber as well as onto one or more filters in the air flow pathway filter drying cycle. In a subsequent washing cycle, the lint or fluff from the previous drying cycle can deposit on the laundry items during the washing cycle. Further, the accumulation of lint on the filters during operation can negatively affect performance of the laundry appliance, specifically during drying phases. The lint can, for example, accumulate at an inlet of the drying air duct (e.g., inlet of a recirculation system, or blower) and restrict the airflow from the tub to the drying air duct, therefore, reducing the drying efficiency of the laundry treating appliance and wasted energy resources. In the present disclosure, a combination washing and drying machine includes a lint cleanout routine to wash lint from the interior of the tub and the filter and drain the lint from the appliance prior to beginning the wash cycle. The lint cleanout routine can be implemented as a stand-alone cycle of operation or as an add-on to another cycle of operation.

The present disclosure also includes a strategy for when to implement the lint clean out routine. The implementation of the lint cleanout routine is not typically needed if there has not been a drying phase or cycle of operation. While combo machines are typically run with back-to-back wash and dry cycles of operation, they can be operated with just a wash cycle of operation or just a dry cycle of operation. If a lint cleanout routine is run after a stand alone wash cycle of operation, there is little to no lint to remove and implementing the lint cleanout routine is not an efficient use of resources. Thus, the present disclosure looks to various ways of determining when a drying cycle of operation has occurred, be it stand-alone or in combination with a wash cycle of operation. The lint cleanout routine can be run after a drying cycle of operation has occurred or after a predetermined number of drying cycles.

Laundry treating appliances are typically categorized as either a vertical axis laundry treating appliance or a horizontal axis laundry treating appliance. As used herein, the term "horizontal axis" laundry treating appliance refers to a laundry treating appliance having a rotatable drum that rotates about a generally horizontal axis relative to a surface that supports the laundry treating appliance. The drum can rotate about the axis inclined relative to the horizontal axis, with fifteen degrees of inclination being one example of the inclination. Similar to the horizontal axis laundry treating appliance, the term "vertical axis" laundry treating appliance refers to a laundry treating appliance having a rotatable drum that rotates about a generally vertical axis relative to a surface that supports the laundry treating appliance. However, the rotational axis need not be perfectly vertical to the surface. The drum can rotate about an axis inclined relative to the vertical axis, with fifteen degrees of inclination being one example of the inclination.

Regardless of the axis of rotation, a laundry treating appliance can be top-loading or front-loading. In a top-loading laundry treating appliance, laundry items are placed into the drum through an access opening in the top of a cabinet, while in a front-loading laundry treating appliance laundry items are placed into the drum through an access opening in the front of a cabinet. If a laundry treating appliance is a top-loading horizontal axis laundry treating appliance or a front-loading vertical axis laundry treating appliance, an additional access opening is located on the drum.

FIG. 1 is a schematic cross-sectional view of a laundry treating appliance illustrated as a horizontal axis combination washer/dryer 10. It will be understood that the laundry treating appliance need not be a combination washing and drying laundry treating appliance, but that any suitable laundry treating appliance for treating laundry items placed therein, non-limiting examples of which include a horizontal or vertical axis clothes washer; a horizontal or vertical axis clothes dryer; a combination washing machine and dryer; a tumbling or stationary refreshing/revitalizing machine; an extractor; a non-aqueous washing apparatus; and a revitalizing machine. While the laundry treating appliance is illustrated herein as a horizontal axis, front-load laundry treating appliance, the aspects of the present disclosure can have applicability in laundry treating appliances with other configurations. The laundry treating appliance shares many features of a conventional automated clothes washer and/or dryer, which will not be described in detail herein except as necessary for a complete understanding of the exemplary aspects in accordance with the present disclosure.

The combination washer/dryer 10 can include a structural support assembly comprising a cabinet 12 which defines a housing within which a laundry holding assembly resides. The cabinet 12 can be a housing having a chassis and/or a frame, to which decorative panels can or cannot be mounted, defining an interior, enclosing components typically found in a conventional laundry treating appliance, such as motors, pumps, fluid lines, controls, sensors, transducers, and the like. Such components will not be described further herein except as necessary for a complete understanding of the present disclosure.

The laundry holding assembly of the illustrated combination washer/dryer 10 comprises a tub 14 dynamically suspended within the structural support system of the cabinet 12 by a suitable suspension system 15, the tub 14 at least partially defining a treating chamber 18. A rotatable drum 16 can be provided within the tub 14 to further define at least a portion of the laundry treating chamber 18. The drum 16 is configured to receive a laundry load comprising articles for treatment, including, but not limited to, a hat, a scarf, a glove, a sweater, a blouse, a shirt, a pair of shorts, a dress, a sock, and a pair of pants, a shoe, an undergarment, and a jacket.

The drum 16 can include a plurality of perforations 20 such that liquid can flow between the tub 14 and the drum 16 through the perforations 20. It is also within the scope of the present disclosure for the laundry holding system to comprise only one receptacle with the receptacle defining the laundry treating chamber 18 for receiving the load to be treated. At least one lifter 22 can extend from a wall of the drum 16 to lift the laundry load received in the treating chamber 18 while the drum 16 rotates.

The laundry holding assembly can further include a closure, illustrated herein as a door assembly 24 which can be movably mounted to or coupled to the cabinet 12 to selectively close both the tub 14 and the drum 16, as well as the treating chamber 18. By way of non-limiting example, the door assembly 24 can be hingedly coupled to the cabinet 12 for movement between an opened condition (not shown) and a closed condition as shown.

A bellows 26 can extend between the tub 14 and the cabinet 12 to couple an open face of the tub 14 with the cabinet 12, with the door assembly 24 sealing against the bellows 26 or the cabinet 12, or both, when the door assembly 24 closes the tub 14. In the opened condition, the door assembly 24 can be spaced apart from the bellows 26 and can allow access to the treating chamber 18. The bellows 26 can sealingly couple the open face of the tub 14 with the cabinet 12 such that liquid is not permitted to move from the tub 14 into the interior of the cabinet 12.

The combination washer/dryer 10 can further comprise a washing circuit which can include a liquid supply system for supplying water to the combination washer/dryer 10 for use in treating laundry during a cycle of operation. The liquid supply system can include a source of water, such as a household water supply 30, which can include separate valves 32, 34 for controlling the flow of hot and cold water, respectively. The valves 32, 34 can be opened individually or together to provide a mix of hot and cold water at a selected temperature. The valves 32, 34 are selectively openable to supply water through an inlet conduit 36 directly to the tub 14 or the drum 16 by controlling first and second diverter mechanisms 38 and 40, respectively. The diverter mechanisms 38, 40 can each be a diverter valve having two outlets such that each of the diverter mechanisms 38, 40 can selectively direct a flow of liquid to one or both of two flow paths. Water from the household water supply 30 can flow through the inlet conduit 36 to the first diverter mechanism 38 which can direct the flow of liquid to a supply conduit 42. The second diverter mechanism 40 on the supply conduit 42 can direct the flow of liquid to a tub outlet conduit 44 which can be provided with a spray nozzle 46 configured to spray the flow of liquid into the tub 14 in a desired pattern and under a desired amount of pressure. For example, the spray nozzle 46 can be configured to dispense a flow or stream of water into the tub 14 by gravity, i.e. a non-pressurized stream. In this manner, water from the household water supply 30 can be supplied directly to the tub 14. While the valves 32, 34 and the inlet conduit 36 are illustrated exteriorly of the cabinet 12, it will be understood that these components can be internal to the cabinet 12.

The combination washer/dryer 10 can also be provided with a dispensing system for dispensing treating chemistry to the treating chamber 18 for use in treating the load of laundry according to a cycle of operation. The dispensing system can include a treating chemistry dispenser 52 which can be a single dose dispenser, a bulk dispenser, or an integrated single dose and bulk dispenser and is fluidly coupled to the treating chamber 18. Optionally, a sensor 53 can be positioned in or near the dispenser 52 to sense the presence of treating chemistry. The treating chemistry dispenser 52 can be configured to dispense a treating chemistry directly to the tub 14 or mixed with water from the liquid supply system through a dispensing outlet conduit 54. Further, water from the water supply 30 can also be supplied to the tub 14 through the treating chemistry dispenser without the addition of treating chemistry. The dispensing outlet conduit 54 can include a dispensing nozzle 56 configured to dispense the treating chemistry into the tub 14 in a desired pattern and under a desired amount of pressure. For example, the dispensing nozzle 56 can be configured to dispense a flow or stream of treating chemistry into the tub 14 by gravity, i.e. a non-pressurized stream. Water can be supplied to the treating chemistry dispenser 52 from the supply conduit 42 by directing the diverter mechanism 40 to direct the flow of water to a dispensing supply conduit 58.

The treating chemistry dispenser 52 can include multiple chambers or reservoirs for receiving doses of different treating chemistries. The treating chemistry dispenser 52 can be implemented as a dispensing drawer that is slidably received within the cabinet 12, or within a separate dispenser housing which can be provided in the cabinet 12. The treating chemistry dispenser 52 can be moveable between a fill position, where the treating chemistry dispenser 52 is exterior to the cabinet 12 and can be filled with treating chemistry, and a dispense position, where the treating chemistry dispenser 52 are interior of the cabinet 12.

Non-limiting examples of treating chemistries that can be dispensed by the dispensing system during a cycle of operation include one or more of the following: water, detergents, surfactants, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof. The treating chemistries can be in the form of a liquid, powder, or any other suitable phase or state of matter.

The combination washer/dryer 10 can also include a recirculation and drain system for recirculating liquid within the laundry holding system and draining liquid from the combination washer/dryer 10. Liquid supplied to the tub 14 through tub outlet conduit 44 and/or the dispensing supply conduit 58 typically enters a space 59 between the tub 14 and the drum 16 and can flow by gravity to a sump 60 formed in part by a lower portion of the tub 14. The sump 60 can also be formed by a sump conduit 62 that can fluidly couple the lower portion of the tub 14 to a pump 64. The pump 64 have an inlet fluidly coupled with the sump 60 and an outlet configured to fluidly couple to and to direct liquid to a drain conduit 66, which can drain the liquid from the combination washer/dryer 10, or to a recirculation conduit 68, which can terminate at a recirculation inlet 70. The recirculation inlet 70 can direct the liquid from the recirculation conduit 68 into the drum 16. The recirculation inlet 70 can introduce the liquid into the drum 16 in any suitable manner, such as by spraying, dripping, or providing a steady flow of liquid. In this manner, liquid provided to the tub 14, with or without treating chemistry can be recirculated into the treating chamber 18 for treating the load of laundry within. The recirculation and drain assembly can include other types of recirculation systems.

The liquid supply and/or recirculation and drain system can be provided with a heating system which can include one or more devices for heating laundry and/or liquid supplied to the tub 14, such as a steam generator 72, an inline heater 73, and/or a sump heater 74. Liquid from the household water supply 30 can be provided to the steam generator 72 through the inlet conduit 36 by controlling the first diverter mechanism 38 to direct the flow of liquid to a steam supply conduit 76. Steam generated by the steam generator 72 can be supplied to the tub 14 through a steam outlet conduit 77. The steam generator 72 can be any suitable type of steam generator such as a flow through steam generator or a tank-type steam generator. Alternatively, the sump heater 74 can be used to generate steam in place of or in addition to the steam generator 72. In addition or alternatively to generating steam, the steam generator 72 and/or sump heater 74 can be used to heat the laundry and/or liquid within the tub 14 as part of a cycle of operation. The sump heater 74 can be provided within the sump 60 to heat liquid that collects in the sump 60. Alternatively, the heating assembly can include an in-line heater that heats the liquid as it flows through the liquid supply, dispensing, and/or recirculation assemblies.

It is noted that the illustrated suspension system, liquid supply system, recirculation and drain system, and dispensing system are shown for exemplary purposes only and are not limited to the systems shown in the drawings and described above. For example, the liquid supply, dispensing, and recirculation and pump systems can differ from the configuration shown in FIG. 1, such as by inclusion of other valves, conduits, treating chemistry dispensers, sensors, such as water level sensors and temperature sensors, and the like, to control the flow of liquid through the combination washer/dryer 10 and for the introduction of more than one type of treating chemistry. For example, the liquid supply system can include a single valve for controlling the flow of water from the household water source. In another example, the recirculation and pump system can include two separate pumps for recirculation and draining, instead of the single pump as previously described. In yet another example, the liquid supply assembly can be configured to supply liquid into the interior of the drum 16 or into the interior of the tub 14 not occupied by the drum 16, such that liquid can be supplied directly to the tub 14 without having to travel through the drum 16.

The combination washer/dryer 10 also includes a drive system for rotating the drum 16 within the tub 14. The drive system can include a motor 78, which can be directly coupled with the drum 16 through a drive shaft 80 to rotate the drum 16 about a rotational axis during a cycle of operation. The motor 78 can be a brushless permanent magnet (BPM) motor having a stator 82 and a rotor 84. Alternately, the motor 78 can be coupled to the drum 16 through a belt and a drive shaft to rotate the drum 16, as is known in the art. Other motors, such as an induction motor or a permanent split capacitor (PSC) motor, can also be used. The motor 78 can rotate the drum 16 at various speeds in either rotational direction.

The motor 78 can rotate the drum 16 at various speeds in opposite rotational directions. In particular, the motor 78 can rotate the drum 16 at tumbling speeds wherein the fabric items in the drum 16 rotate with the drum 16 from a lowest location of the drum 16 towards a highest location of the drum 16, but fall back to the lowest location of the drum 16 before reaching the highest location of the drum 16. The rotation of the fabric items with the drum 16 can be facilitated by the at least one lifter 22. Typically, the force applied to the fabric items at the tumbling speeds is less than about 1 G. Alternatively, the motor 78 can rotate the drum 16 at spin speeds wherein the fabric items rotate with the drum 16 without falling. The spin speeds can also be referred to as satellizing speeds or sticking speeds. Typically, the force applied to the fabric items at the spin speeds is greater than or about equal to 1 G. As used herein, "tumbling" of the drum 16 refers to rotating the drum at a tumble speed, "spinning" the drum 16 refers to rotating the drum 16 at a spin speed, and "rotating" of the drum 16 refers to rotating the drum 16 at any speed.

The combination washer/dryer 10 can further comprise a drying air circuit 90 fluidly coupled to the treating chamber 18 for drying laundry items. The drying air circuit 90 can be a closed loop circuit or an open loop circuit. The drying air circuit 90 can comprise a treating chamber air inlet 92 and a treating chamber air outlet 94, and specifically can be fluidly coupled with the treating chamber air inlet 92 and the treating chamber air outlet 94 and configured to supply drying air through the treating chamber 18 from the treating chamber air inlet 92 to the treating chamber air outlet 94. While the treating chamber air inlet 92 is illustrated herein as being provided on the bellows 26, it will be understood that the treating chamber air inlet 92 can be any provided at any suitable position of the treating chamber 18, including as an opening in at least one of the drum 16 or the tub 14. The treating chamber air outlet 94 is illustrated herein as being provided at a rear wall of the tub 14, the drum 16, and the treating chamber 18, though such a position is not limiting. The treating chamber air outlet 94 can include a filter 93 to prevent lint from entering the drying air circuit 90. The treating chamber air inlet 92 and the treating chamber air outlet 94 can be provided at any suitable locations of the treating chamber 18 so long as they are spaced from one another to allow drying air to flow through the treating chamber 18.

In one example, the drying air circuit 90 can be provided as a closed loop, or recirculating, drying air circuit 90, as illustrated herein. The closed loop drying air circuit 90 can define a drying air flow pathway, as indicated by the arrows 95, to recirculate air through the treating chamber 18. The closed loop drying air circuit 90 can include a condenser 96, a blower 98, a heating portion 100, and a drying air conduit 102. The condenser 96 can be provided with a condenser drain conduit (not shown) that fluidly couples the condenser 96 with the pump 64 and the drain conduit 66. Condensed liquid collected within the condenser 96 can flow through the condenser drain conduit to the pump 64, where it can be provided to the recirculation and drain assembly. The blower 98 is fluidly coupled to the treating chamber 18 such that actuation of the blower 98 supplies or circulates air through the treating chamber 18 by flowing air from the treating chamber air inlet 92 to the treating chamber air outlet 94. The heating portion 100 can enclose at least one heater or heating element (not shown) that is configured to heat recirculating air that flows through the drying air circuit 90. In one example, the drying air circuit 90 can be provided adjacent an upper portion of the tub 14, though it will be understood that the drying air circuit 90 need not be provided adjacent the upper portion of the tub 14, and can be provided at any suitable location adjacent the tub 14 or the treating chamber 18.

In one example, the drying air flow pathway 95 can pass through the components of the closed loop drying air circuit 90 such that air exiting the treating chamber 18 through the treating chamber air outlet 94 flows through the condenser 96, through the blower 98, through the heating portion 100 to be heated to become drying air, and then through the drying air conduit 102 to enter the treating chamber 18 through the treating chamber air inlet 92. However, while the blower 98 is illustrated herein as being provided in between the condenser 96 and the heating portion 100, and specifically downstream of the condenser 96 and upstream of the heating portion 100, it will be understood that the blower 98 can be provided at any suitable location within the drying air circuit 90 so as to drive the supply of air along the drying air flow pathway 95. By way of non-limiting example, the blower 98 can be provided between the treating chamber air outlet 94 and the condenser 96 or between the heating portion 100 and the treating chamber air inlet 92. Further, while the closed loop drying air circuit 90 is illustrated herein as including both the condenser 96 and the heating portion 100, it will be understood that the closed loop drying air circuit 90 could also include the condenser 96, but not the heating portion 100, or could include the heating portion 100, but not the condenser 96.

When the drying air circuit 90 is provided as an open loop drying air circuit 90, the condenser 96 is not necessary. Alternatively, the blower 98, instead of being fluidly coupled with the condenser 96, can be fluidly coupled with an ambient air source, which can draw ambient air either from within the cabinet 12 or from the exterior of the cabinet 12. The ambient air can be provided from the blower 98 to the heating portion 100 to be heated to be provided through the drying air conduit 102 to enter the treating chamber 18 through the treating chamber air inlet 92. Air that flows through the treating chamber 18 and gathers moisture from the laundry items within the treating chamber 18, and is then exhausted through the treating chamber air outlet 94 and can be exhausted to the exterior of the cabinet 12. As the drying air is not being recirculated to the treating chamber 18, no condensing is necessary. In such an example, while the blower 98 is illustrated as being provided upstream of the heating portion 100, it will also be understood that the blower 98 can be provided between the heating portion 100 and the treating chamber air inlet 92. Additionally or alternatively, the same blower 98 or an additional blower 98 can be provided downstream of the treating chamber air outlet 94 to draw the exhaust air out of the treating chamber 18.

The combination washer/dryer 10 also includes a control system for controlling the operation of the combination washer/dryer 10 to implement one or more cycles of operation. The control system can include a controller 106 located within the cabinet 12 and a user interface 108 that is operably coupled with the controller 106. The user interface 108 can provide an input and output function for the controller 106. In one example, the user interface 108 can be provided or integrated with the door assembly 24. In another example, as shown, the user interface 108 can be provided on a front panel of the cabinet 12.

The user interface 108 can include one or more knobs, dials, switches, displays, touch screens and the like for communicating with the user, such as to receive input and provide output. For example, the displays can include any suitable communication technology including that of a liquid crystal display (LCD), a light-emitting diode (LED) array, or any suitable display that can convey a message to the user. The user can enter different types of information including, without limitation, cycle selection and cycle parameters, such as cycle options. Other communications paths and methods can also be included in the combination washer/dryer 10 and can allow the controller 106 to communicate with the user in a variety of ways. For example, the controller 106 can be configured to send a text message to the user, send an electronic mail to the user, or provide audio information to the user either through the combination washer/dryer 10 or utilizing another device such as a mobile phone.

The controller 106 can include the machine controller and any additional controllers provided for controlling any of the components of the combination washer/dryer 10. For example, the controller 106 can include the machine controller and a motor controller. Many known types of controllers can be used for the controller 106. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), can be used to control the various components.

Figure 2:
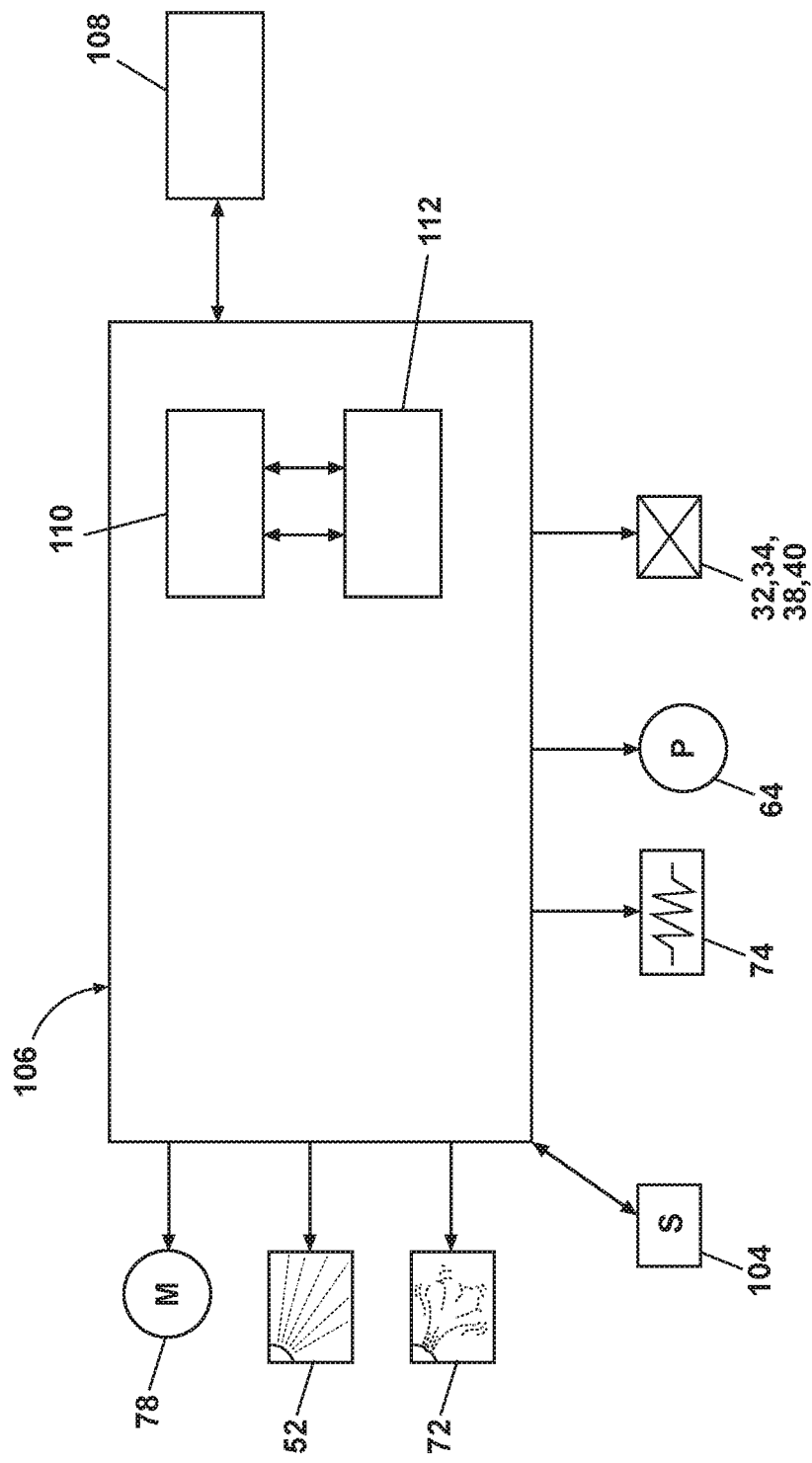
FIG. 2 illustrates a schematic of a control system of the laundry treating appliance of FIG. 1 according to an aspect of the present disclosure.

As illustrated in FIG. 2, the controller 106 can be provided with a memory 110 and a central processing unit (CPU) 112. The memory 110 can be used for storing the control software that is executed by the CPU 112 in completing a cycle of operation using the combination washer/dryer 10 and any additional software. Examples, without limitation, of cycles of operation include: wash, heavy duty wash, delicate wash, quick wash, pre-wash, refresh, rinse only, timed wash, dry, heavy duty dry, delicate dry, quick dry, or automatic dry, which can be selected at the user interface 108. The memory 110 can also be used to store information, such as a database or table, and to store data received from one or more components of the combination washer/dryer 10 that can be communicably coupled with the controller 106. The database or table can be used to store the various operating parameters for the one or more cycles of operation, including factory default values for the operating parameters and any adjustments to them by the control system or by user input.

The controller 106 can be operably coupled with one or more components of the combination washer/dryer 10 for communicating with and controlling the operation of the component to complete a cycle of operation. For example, the controller 106 can be operably coupled with the valves 32, 34 and the diverter mechanisms 38, 40 for controlling the temperature and flow rate of treating liquid into the treating chamber 18, the motor 78 for controlling the direction and speed of rotation of the drum 16, the pump 64 for controlling the amount of treating liquid in the treating chamber 18 or sump 60, the treating chemistry dispenser 52 for controlling the flow of treating chemistries into the treating chamber 18, the user interface 108 for receiving user selected inputs and communicating information to the user, the steam generator 72, the sump heater 74, and the drying air circuit 90, including the blower 98 and the heating portion 100, to control the operation of these and other components to implement one or more of the cycles of operation.

The controller 106 can also be coupled with one or more sensors 104 provided in one or more of the assemblies of the combination washer/dryer 10 to receive input from the sensors 104, which are known in the art and not shown for simplicity. Non-limiting examples of sensors 104 that can be communicably coupled with the controller 106 include: a treating chamber temperature sensor, such as a thermistor, which can detect the temperature of the treating liquid in the treating chamber 18 and/or the temperature of the treating liquid being supplied to the treating chamber 18, a moisture sensor, a weight sensor, a chemical sensor, a position sensor, an imbalance sensor, a load size sensor, and a motor torque sensor, which can be used to determine a variety of assembly and laundry characteristics, such as laundry load inertia or mass. In one example, a characteristic determined by the controller 106 based on input from sensors 104 can include a determination of whether treating chemistry has been added to a single dose dispenser prior to beginning a cycle of operation.

Figure 3A:
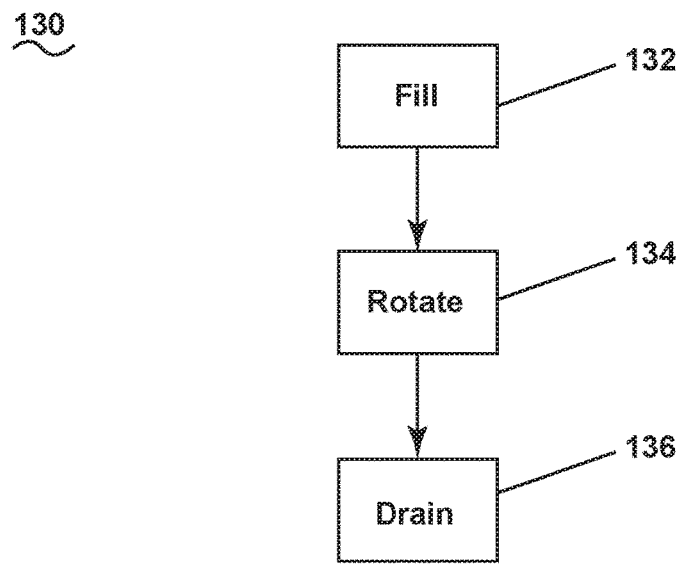
FIG. 3A is a flowchart of a method of operating the laundry treating appliance of FIG. 1 according to an aspect of the present disclosure.

FIG. 3A is a flowchart of a method of operating a lint cleanout routine (LCR) 130 in the combination washer/dryer 10. It is contemplated that the LCR 130 can be implemented automatically as part of a wash cycle, or can be implemented manually when a user selects a LCR 130 at the user interface 108. For example, the user interface could have a user input allowing the user to select an LCR, allowing the user the run the routine at any time. The LCR 130 comprises a fill 132, a rotate 134, and a drain 136. At the filling 132, a charge of water is added to the tub 14. The rotating 134 comprises rotating the drum 16 at a predetermined speed for a predetermined length of time to result in dynamic or turbulent water passing across the filter 93 to dislodge lint from the filter 93. At drain 136, lint and water from the lint cleanout routine 130 are drained from the sump 60 by the pump 64 via the drain conduit 66.

Figure 3B:
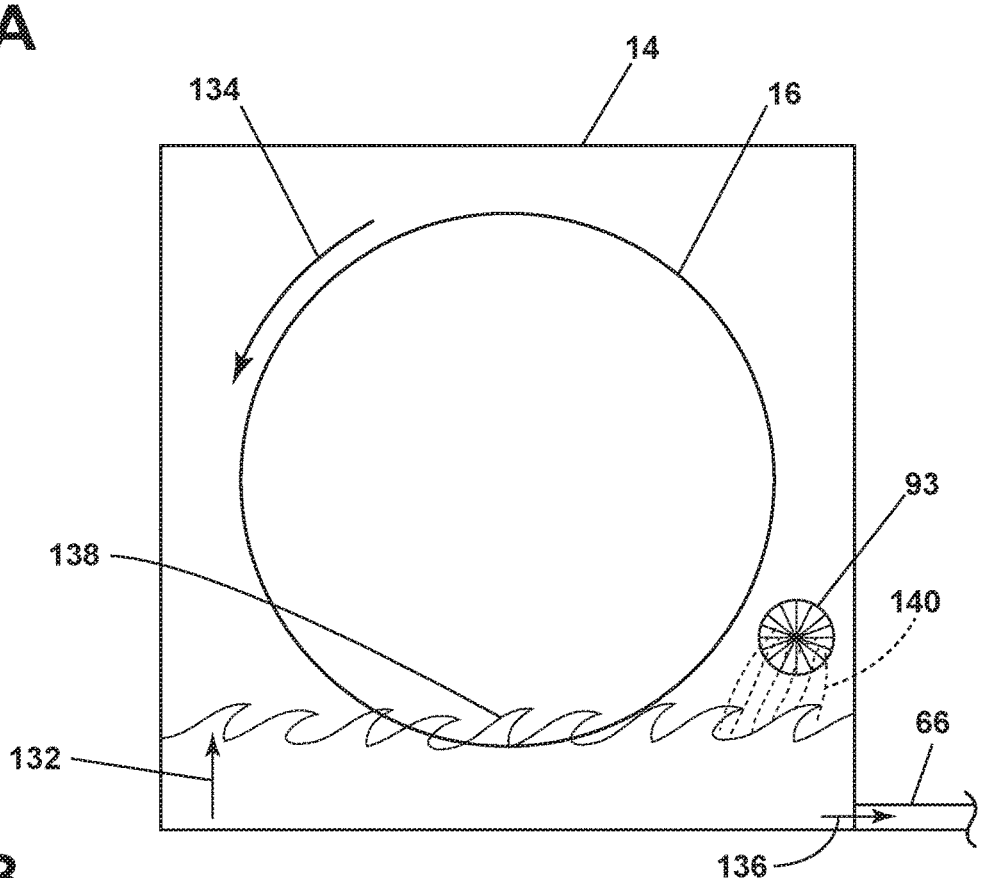
FIG. 3B is a schematic illustration of the method of FIG. 3A.

FIG. 3B schematically illustrates the LCR 130 in the combination washer/dryer 10. By way of non-limiting example, the LCR 130 begins with the fill 132 with a charge of water 138 added to the tub 14 that is sufficient to partially immerse the drum 16, but not immerse the filter 93. For a typical machine, it is contemplated that such a charge of water will be 60 deciliters (about 1.58 US gallons), which is less than the amount of water for a typical treating cycle of operation. Of course, the amount of water is dependent on the size of the tub and drum, the location of the drum in the tub, and the location of the filter 93 relative to the drum.

After filling 132 is completed, or, even during filling, 132, rotating is initiated at 134, where the drum 16 rotated such that the drum 16 interacts with the water 138 to impart sloshing of a portion 140 of the water 138 onto the filter 93. For a typical machine, it is contemplated to rotate the drum in direction coming up toward the bottom of the filter, which would be counterclockwise in FIG. 3B, and for approximately 30 seconds. While the motion of the water is described as "sloshing", any motion that removes the lint from the filter 93 is acceptable. The rotating 134 is intended to create some type of water movement that will remove the lint from the filter. While the movement of the water is accomplished by rotating the drum 16, it is contemplated that other devices could be used to effect such movement of the water, including dedicated devices such as a baffle, stirrer or pressurized air.

During or after completion of the rotating 134, a draining 136 is implemented to remove the lint-laden water from the tub. The draining can be accomplished by energizing the drain pump and draining the lint-laden water out the drain conduit 66.

Variations to the described LCR are contemplated. For example, the amount of water 138 required for the fill 132 can be varied from that described. The amount of water needed can be machine dependent and is the amount of water 138 required to interact with the drum 16, or other water moving device, to sufficiently dislodge at least some of the lint from the filter 93. For machines using the rotating drum to move the water, the amount of water should immerse enough of the drum such that rotation of the drum will move the water to wash the lint from the filter. Additional water is not needed and will create an additional load on the motor while it tries to rotate the drum through the water. That said, if a powerful enough motor were available, the amount of water could fully or partially immerse the filter 93. However, such immersing of the filter 93 undesirably consumes more resources in that more water is used and the motor would consume more electricity to move the greater amount of water as compared to the water level where the inlet is not immersed. Further, because the filter 93 is at the treating chamber air outlet 94 which is fluidly connected to the condenser 96, immersing the filter 93 in the water 138 could result in water entering the treating chamber air outlet 94 or the condenser 96 which may result in decreased efficiency of the drying air circuit 90 due to the presence of water in the drying air circuit 90 or damage to portions of the drying air circuit 90.

The rotating 134 can be varied from what was described. The rotating 134 can include a single rotation cycle, or multiple rotation cycles, which may be separated by a pause or dwell, before proceeding to draining 136. The length of time, speed, and direction for each rotation cycle can be the same or different. The length of time, speed, and rotation direction of each rotation or a combination of rotations can be determined by the degree of interaction between the water 138 of the filling 132 and the filter 93 required to impart the amount of sloshing required to dislodge lint from the filter 93. The required turbulence of the water 138 to dislodge lint from the filter 93 can also determine the speed and direction of rotation of the drum 16 during each rotation. The drum 16 can be rotated counterclockwise, clockwise, in a reciprocating fashion alternating between counterclockwise and clockwise, or a combination.

When or if to implement the LCR 130 can be an issue depending on the type of laundry treating appliance. Some laundry treating appliances include only a single water supply fluidly connecting the household water supply to the treating chamber, with the single water supply passing through the treating chemistry dispenser for use in carrying the treating chemistry to the treating chamber. In this type of laundry treating appliance, since executing an LCR includes supplying water to the tub, any treating chemistry in the dispenser would be flushed from the dispenser into the tub during the filling 132 and drained out of the appliance during the draining 136. Flushing the treating chemistry prior to a wash cycle would result in running the cycle without treating chemistry and wastes treating chemistry by simply flushing it out of the appliance. Given that flushing treating chemistry out of the laundry treating appliance prior to a wash cycle is not desirable, it is prudent to determine if a treating chemistry dispenser contains treating chemistry prior to initiating an LCR. If the treating chemistry dispenser does contain treating chemistry, then the LCR can be delayed to avoid prematurely flushing treating chemistry from the dispenser.

Figure 4:
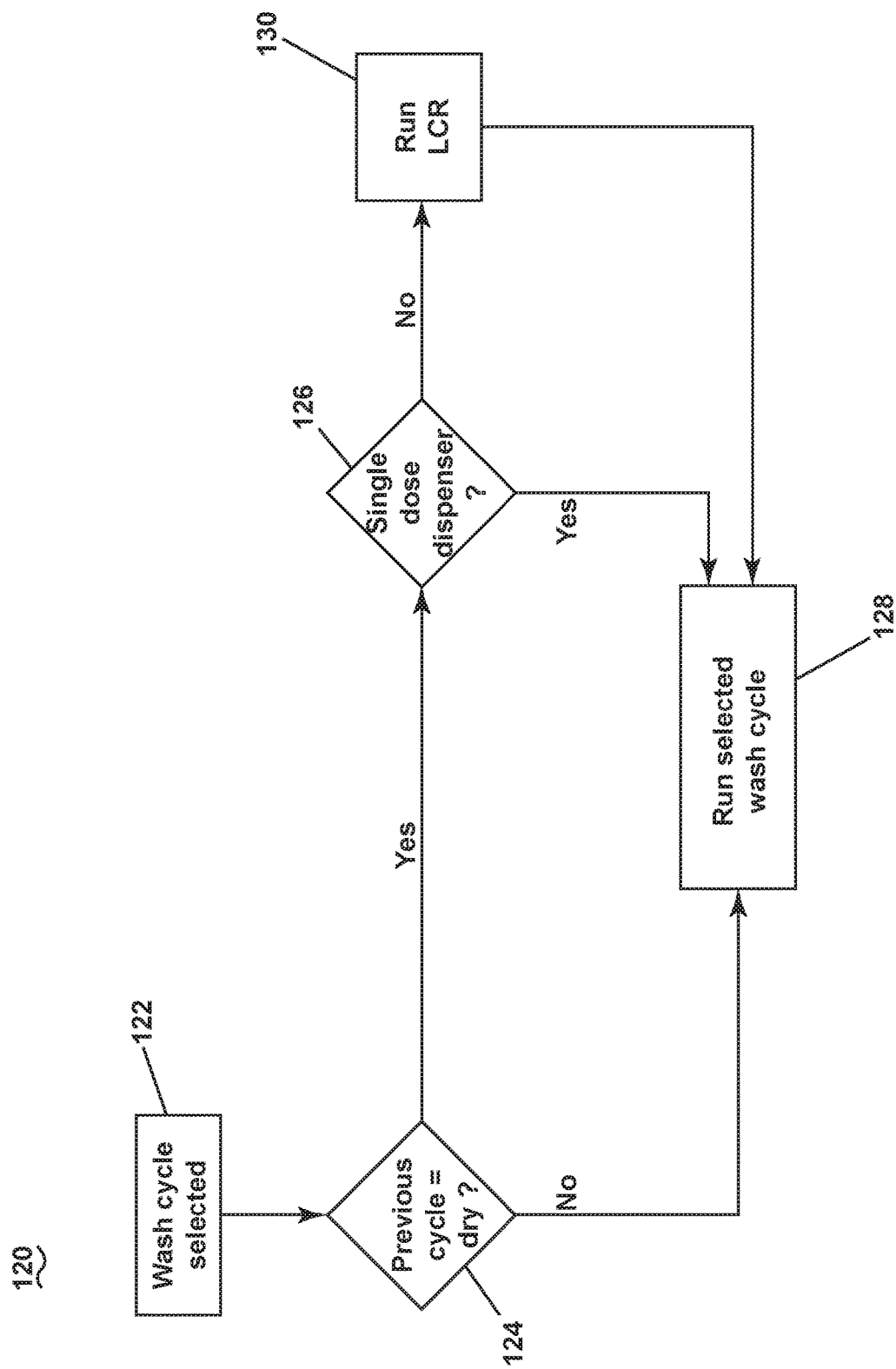
FIG. 4 is a diagram of a method of operating the laundry treating appliance of FIG. 1 incorporating the method of FIG. 3A according to an aspect of the present disclosure.

Referring now to FIG. 4, a method 120 of operating the controller 106 to determine when or if to run the lint cleanout routine (LCR) 130 is described. The method 120 begins when any type of wash cycle is selected by a user at 122. At 124, the controller 106 determines whether the previous cycle performed by the combination washer/dryer 10 was or included any type of a dry cycle. If a dry cycle was not previously run, then there wouldn't be any appreciable collection of lint on the filter and there is no need to run the LCR 130. When it is determined that no dry cycle was previously run, then the LCR is not implemented and the selected wash cycle is run at 128.

If a dry cycle of any type was previously run, then execution of the LCR 130 is desirable and decision control is passed to a check at 126 to determine if there is treating chemistry in a single dose dispenser which would be undesirably flushed out by executing the LCR 130. The check at 126 can be done for any machine, but is most suitable for machines with one water supply that passes through the dispenser. For the check at 126, the controller 106 determines whether the single dose dispenser is "selected" for the current cycle. The single dose dispenser can be selected manually by a user via selection of a cycle requiring manual addition of treatment chemistry to the single dose dispenser, or a user can manually select the single dose dispenser from the user interface 108. The single dose dispenser can also be selected automatically upon adding treating chemistry to the single dose dispenser, for example, a sensor 53 in or near the single dose dispenser can sense the presence or the addition of treating chemistry to the single dose dispenser and send a signal to the controller 106 indicating the presence of treating chemistry in the single dose dispenser. If the single dose dispenser is not selected, then the LCR 130 is initiated, after which the method proceeds to the selected wash cycle at 128. If the single dose dispenser is selected, the LCR 130 will not be initiated and the method continues to the selected wash cycle 128.

Some laundry treating appliances can include a secondary water supply or 'fresh fill' that is not fluidly connected to a treating chemistry dispenser. In this type of laundry treating appliance, if supplying water to the tub 14 during the filling 132 of the LCR 130 can be executed by the secondary water supply, then the LCR 130 can be initiated without premature flushing of treating chemistry from the dispenser. For example, the combination washer/dryer 10 can have a secondary water supply via the second diverter mechanism 40 and the spray nozzle 46 configured to supply water from the household supply 30 directly to the tub 14, or to a condenser valve inlet. Since the secondary water supply can be configured to bypass the single dose dispenser, the method 120 can simply determine whether the previous cycle was a dry cycle at 124, and if yes, then the method can proceed to the LCR 130 prior to running the selected wash cycle 128.

Optionally, if the combination washer/dryer 10 is equipped with bulk dispensing, the controller 106 can determine whether a bulk dispenser has been selected for the current cycle. Selection of the bulk dispenser to dispense treating chemistry for the cycle of operation can passively indicate the non-selection of the single dose dispenser to the controller 106. The bulk dispenser can be selected by a user via selection of a cycle requiring bulk dispensing, manually selecting the bulk dispenser from the user interface 108, or the bulk dispenser can be selected automatically by the controller 106 if the presence of treating chemistry in the single dose dispenser is not detected by a sensor. In a combination washer/dryer 10 with only a single water inlet configured to enter the single dose dispensing chamber, selection of the bulk dispenser can provide the indication to the controller 106 that the single dose dispenser is not selected for the cycle of operation allowing water to enter the single dose dispensing chamber without the premature addition of treating chemistry to the cycle of operation, and therefore, the method 120 can initiate the lint cleanout routine (LCR) 130 prior to the wash cycle 128. Conversely, the non-selection of the bulk dispenser can passively indicate the selection of the single dose dispenser, in which case, the method 120 does not initiate the LCR 130 and proceeds to the selected wash cycle 128.

Alternatively, the method 120 can include both single dose dispenser and bulk dispenser selection detection where the controller 106 can first determine whether a bulk dispenser has been selected and then whether a single dose dispenser has been selected at 126, or vice-versa, prior to determining whether to initiate the LCR 130.

To the extent not already described, the different features and structures of the various aspects can be used in combination with each other as desired, or can be used separately. That one feature can not be illustrated in all of the aspects is not meant to be construed that it cannot be, but is done for brevity of description. Thus, the various features of the different aspects can be mixed and matched as desired to form new aspects, whether or not the new aspects are expressly described.

While the present disclosure has been specifically described in connection with certain specific aspects thereof, it is to be understood that this is by way of illustration and not of limitation. Reasonable variation and modification are possible within the scope of the forgoing disclosure and drawings without departing from the spirit of the present disclosure. Hence, specific dimensions and other physical characteristics relating to the aspects disclosed herein are not to be considered as limiting, unless expressly stated otherwise.

What is claimed is:

1. A method of cleaning a lint filter in a combination washer/dryer having a tub, a controller, a drum rotatably mounted within the tub, an air conduit having a port fluidly connected to the tub, and a lint filter fluidly coupled to the port and located in the tub, the method comprising: determining, by the controller, when the previous cycle of operation was a drying cycle of operation; and when determining the previous cycle of operation was the drying cycle of operation, automatically implement at a start of a user selection of wash cycle: determining by the controller whether a single dose dispenser is selected for the wash cycle; determining by the controller whether the combination washer/dryer comprises a secondary water supply configured to bypass the single dose dispenser; and when determining the single dose dispenser is selected for the wash cycle and upon determining the combination washer/dryer comprises the secondary water supply, automatically implement: supplying, to the tub, a charge of water through the secondary water supply sufficient to at least partially immerse the drum while not immersing the lint filter; and rotating the drum for a predetermined period of time in order to remove lint from the lint filter.

2. The method of claim 1, wherein determining by the controller whether the single dose dispenser is selected for the wash cycle further comprises determining whether a treating chemistry is in the single dose dispenser.

3. The method of claim 2, wherein the selection of the single dose dispenser comprises one of manual selection by a user via selection of a cycle requiring manual addition of treatment chemistry to the single dose dispenser, or, manual selection of the single dose dispenser by a user from the user interface, or, by automatic selection upon sensing the presence of treating chemistry on the single dose dispenser.

4. The method of claim 3, wherein a sensor senses the presence of treating chemistry in the single dose dispenser.

5. The method of claim 1, further comprising determining by the controller whether the combination washer/dryer comprises a bulk dispenser.

* * * * *